United States Patent [19]
Mamin et al.

[11] Patent Number: 5,856,967
[45] Date of Patent: Jan. 5, 1999

[54] ATOMIC FORCE MICROSCOPY DATA STORAGE SYSTEM WITH TRACKING SERVO FROM LATERAL FORCE-SENSING CANTILEVER

[75] Inventors: Harry Jonathon Mamin, Palo Alto; Daniel Rugar, Los Altos; Benjamin Wai-Ho Chui, Sunnyvale; Thomas William Kenny, San Carlos, all of Calif.

[73] Assignees: International Business Machines Corporation, Armonk, N.Y.; The Board of Trustees of the Leland Stanford Junior University, Stanford, Calif.

[21] Appl. No.: 920,342

[22] Filed: Aug. 27, 1997

[51] Int. Cl.$^6$ ................................................ G11B 7/00
[52] U.S. Cl. ..................... 369/126; 369/44.28; 250/306
[58] Field of Search ............................... 369/126, 44.28, 369/44.29, 44.27, 44.32, 44.34, 47, 48, 54, 58, 43; 250/306, 307

[56] References Cited

U.S. PATENT DOCUMENTS

| | | | |
|---|---|---|---|
| 5,083,466 | 1/1992 | Holm-Kennedy et al. | 73/862.04 |
| 5,251,200 | 10/1993 | Hatanaka et al. | 369/126 |
| 5,321,977 | 6/1994 | Clabes et al. | 73/105 |
| 5,345,815 | 9/1994 | Albrecht et al. | 73/105 |
| 5,386,720 | 2/1995 | Toda et al. | 73/105 |
| 5,444,244 | 8/1995 | Kirk et al. | 250/306 |
| 5,537,372 | 7/1996 | Albrecht et al. | 369/43 |
| 5,721,721 | 2/1998 | Yanagisawa et al. | 369/47 X |

OTHER PUBLICATIONS

J. Brugger et al., "Lateral Force Measurements in a Scanning Force Microscope with Piezoresistive Sensors", Proceedings of the 8th International Conference on Solid–State Sensors and Actuators and Eurosensors IX, Stockholm, Sweden, Jun. 25–29, 1995, p. 636.

*Primary Examiner*—Muhammad N. Edun
*Attorney, Agent, or Firm*—Thomas R. Berthold

[57] ABSTRACT

An atomic force microscope (AFM) based data storage disk drive uses a cantilever structure that provides independent detection of vertical and lateral motion of the AFM tip as a track with data marks moves past the tip. The vertical detection of the tip deflection toward and away from the disk surface is used for data detection of the data marks that form the tracks. The lateral detection of the tip deflection in a direction generally parallel to the plane of the disk surface is used as the input signal to a tracking servo control system to maintain the tip on a data track. The cantilever structure includes a base connected to the disk drive actuator, a beam made up of a plurality of ribs that have their fixed ends connected to the base, and a probe connected to the free ends of the ribs. The beam ribs have piezoresistors connected to electrical circuitry that detects a resistance change as the ribs are bent laterally. The probe includes the AFM tip located at its free end and piezoresistors connected to electrical circuitry that detects a resistance change as the probe is bent vertically. The data tracks are a series of data marks in the form of pits or bumps separated by portions of the disk surface that serve as lands. Alternatively, the data tracks are formed as continuous grooves in the disk surface with the data pits or bumps located at the bottoms of the grooves.

23 Claims, 12 Drawing Sheets

ATOMIC FORCE MICROSCOPY DATA STORAGE SYSTEM WITH TRACKING SERVO FROM LATERAL FORCE-SENSING CANTILEVER

This invention was made with Government support under contract DABT63-95-C-0019 awarded by the Defense Advanced Research Projects Agency of the U.S. Department of Defense. The Government has certain rights in this invention.

RELATED APPLICATION

This application is related to concurrently-filed application Ser. No. 08/924,427 assigned to Stanford University.

TECHNICAL FIELD

This invention relates to atomic force microscope (AFM) systems for data storage wherein the data storage medium, such as a disk, has surface features representing machine-readable information, the information being detected by deflection of the AFM cantilever that has the AFM probe or tip on its free end for interaction with the surface marks.

BACKGROUND OF THE INVENTION

Atomic force microscopy is based upon the principle of sensing the forces between a sharp probe or tip and the surface to be investigated. The interatomic forces induce the displacement of the tip mounted on the free end of a flexible cantilever.

The principle of piezoresistance to detect the deflection of the AFM cantilever is described in U.S. Pat. No. 5,345,815 assigned to Stanford University. The cantilever is formed of single-crystal silicon which is implanted with a dopant to provide a piezoresistive region along the length of the cantilever. Deflection of the free end of the cantilever produces stress in the cantilever. That stress changes the electrical resistance of the piezoresistive region in proportion to the cantilever's deflection. A resistance-measuring apparatus is coupled to the piezoresistive region to measure its resistance and to generate a signal corresponding to the cantilever's deflection.

AFM systems have applications beyond their original application of imaging the surface of a sample. The principle of atomic force microscopy has been extended to data storage, as described in IBM's U.S. Pat. No. 5,537,372. In that data storage application, the tip is in physical contact with the surface of a data storage medium. The medium has surface marks in the form of bumps and/or depressions or pits that represent machine-readable information or data located in data tracks. The deflection of the cantilever is detected and decoded to read the data. Data can also be written on the medium, if the medium has a heat-deformable surface, by heating the tip when it is in contact with the medium surface to form bumps or depressions on the medium surface. The tip is heated by a laser beam directed to the tip region of the cantilever, as described in the '372 patent. In another approach for heating the tip, as described in Chui et al., "Improved Cantilevers for AFM Thermomechanical Data Storage", *Proceedings of Solid-State Sensor and Actuator Workshop,* Hilton Head, S.C., Jun. 2–6, 1996, pp. 219–224, a single-crystal silicon cantilever is selectively doped with boron to provide a conductive path to an electrically-resistive region near the tip. The tip is then resistively heated when current is passed through the conductive path.

It is also possible for the AFM data storage system to operate in the manner similar to that described in the '372 patent, with the tip engaging the medium surface but not in direct contact with the medium surface. Instead, the tip engages the surface of the medium and follows the surface topography of marks without physically contacting the surface. The tip is maintained in sufficiently close proximity to the surface of the medium that van der Waals or electrostatic forces are in effect, even though the tip is not in direct contact with the data marks. The van der Waals forces deflect the tip toward the medium until the tip approaches a data pit which causes a decrease in or even a complete removal of the van der Waals forces. The tip follows and detects the surface topography in this manner. This type of AFM data storage system is based on the "attractive mode" of AFM, as described by Martin et al., "Atomic Force Microscope-force Mapping and Profiling on a Sub 100-Å Scale", *J. Appl. Phys.,* Vol. 61, No. 10, 15 May 1987, pp. 4723–4729.

One of the problems with AFM data storage systems is the difficulty of maintaining the tip on the data tracks during reading of data. Unlike conventional magnetic and optical data storage systems, there is no magnetically or optically recorded servo information that can be decoded and used to servo control the positioning of the tip. In AFM data storage systems, such as that described in the '372 patent, the data density can be 100 times that of a conventional CD-ROM system. The individual data features or marks can be as small as 50 nm and the individual data tracks spaced apart only 100 nm. One type of tracking servo in an AFM data storage system is based on contiguous "wobble" marks placed on opposite sides of the data track centerline in a manner analogous to sector servo marks in magnetic recording, as described by Mamin et al., "High-density Data Storage Using Proximal Probe Techniques", *IBM J. Res. Develop.,* Vol. 39, No. 6, November 1995, pp. 687–688. However, the wobble marks are difficult to detect and fabricate with sufficient accuracy, and it is difficult to achieve a tracking error signal which varies linearly with off-track distance. The '372 patent, in FIGS. 3A–3C, describes an AFM data storage system with tracking control based on a twist of the cantilever, the twist being detected by a quadrant cell photodiode that receives laser light reflected from the cantilever.

What is needed is an AFM data storage system with a tracking servo control system that can maintain the tip on track at these extremely small dimensions.

SUMMARY OF THE INVENTION

The invention is an AFM-based data storage disk drive that uses a cantilever structure that provides independent detection of vertical and lateral motion of the AFM tip as a track with data marks moves past the tip. The vertical detection of the tip deflection toward and away from the disk surface is used for data detection of the data marks in the tracks. The lateral detection of the tip deflection in a direction generally parallel to the plane of the disk surface is used as the input signal to a tracking servo control system to maintain the tip on a data track. The cantilever structure includes a base connected to the disk drive actuator, a beam made up of a plurality of ribs that have their fixed ends connected to the base, and a probe connected to the free ends of the ribs. The beam ribs have piezoresistors connected to electrical circuitry that detects a resistance change as the ribs are bent laterally. The probe is triangular shaped with the AFM tip located at the apex. Piezoresistors are located in the legs of the triangular-shaped probe and connected to electrical circuitry that detects a resistance change as the probe is bent vertically. The data tracks include data marks in the form of pits or bumps separated by portions of the disk surface that serve as lands, in which case the lateral force detection occurs when the probe tip contacts the walls of the pits or bumps. Alternatively, the data tracks are formed as continuous grooves in the disk surface with the data pits or bumps located at the bottoms of the grooves, in which case the lateral force detection occurs when the probe tip contacts the walls of the grooves.

For a fuller understanding of the nature and advantages of the invention, reference should be made to the following detailed description taken together with the accompanying drawings.

DESCRIPTION OF THE PREFERRED EMBODIMENTS

The AFM Data Storage System

Figure 1:
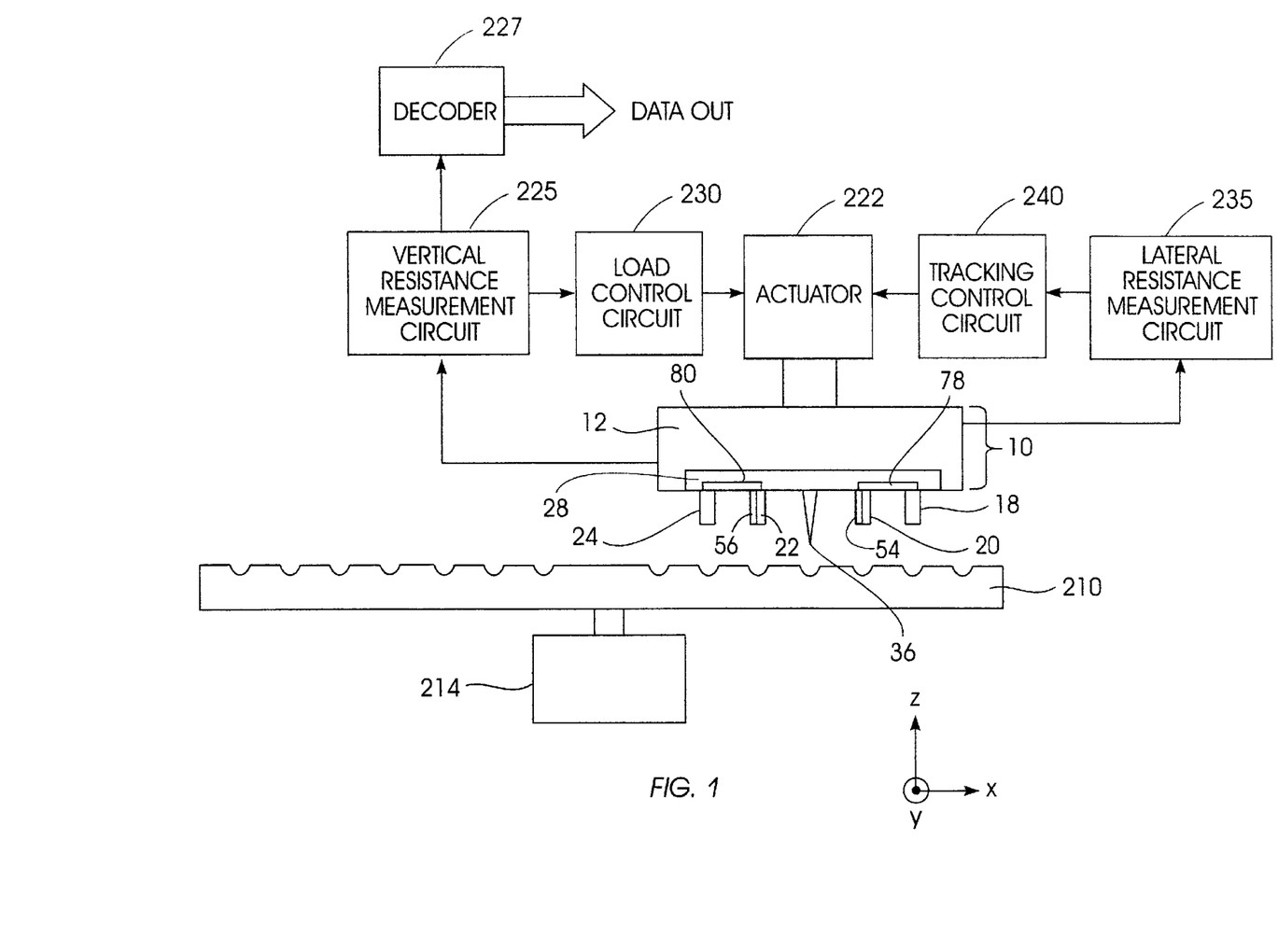
FIG. 1 is a block diagram of the AFM data storage system of the present invention illustrating the system components, including the cantilever structure and its piezoresistors for independently sensing vertical and lateral deflections.

Referring to FIG. 1, the AFM data storage system is shown schematically as a disk drive with a rotatable data storage disk. While the invention will be described in terms of the preferred embodiment of a disk drive, the AFM data storage system will also function with a flat substrate as the storage medium that is moved in an X-Y raster. In that embodiment, the data tracks are arranged as essentially parallel lines that are oriented parallel to either the X or Y direction, whichever is the faster scan direction. The storage medium may either be removable from the system or permanently sealed within it.

In FIG. 1, the storage medium is preferably a circular disk 210 and may be formed in a number of ways. The disk 210 is preferably made from a polymer material, such as polymethyl methacrylate (PMMA), polycarbonate, or an acrylate-based, photocurable polymer, as described in U.S. Pat. No. 4,948,703. The disk 210 is embossed on the upper face with machine-readable information, shown as surface marks in the form of data pits 212. The phrase "machine-readable information" means information that is readable by a digital processing resource such as a programmed computer or microprocessor. More specifically, a plurality of data tracks are provided having a series of surface marks arranged in a machine-readable pattern of data marks or features. The embossed marks may be a series of pits or indentations, such as pits 212, separated by island portions or lands of the disk 210 that are not pitted. Alternatively, instead of pits, a series of raised protuberances or bumps can be provided. The data tracks are radially spaced on the disk and may be formed as either discrete concentric tracks, as in conventional digital magnetic recording disk drives, or spiral tracks, as in compact disc (CD) optical recording. Alternatively, the storage medium need not be circular and need not be moved in a rotary manner.

The disk 210 is positioned above and attached to a spindle motor 214. The disk 210 is supported on the motor and rotated at a uniform speed by the motor 214. The disk 210 is positioned so that the center of the disk is located approximately at the center of rotation of the spindle motor. A microfabricated cantilever structure 10 is shown in end view in engagement with the surface of disk 210. The cantilever structure 10 includes a sharp tip 36 for engagement with the pits 212. The cantilever structure 10 is mounted on a support 220 and positioned above the disk 210. The support 220 is connected to an actuator 222. The actuator 222 is an electromagnetically-driven, voice coil motor (VCM) type actuator as is found in an optical disk or CD player. The actuator 222 is movable both along an axis perpendicular to the disk surface for controlling the load of the tip 36 on the disk 210, and in the plane parallel to the disk 210. The motion in the plane parallel to the disk 210 is at least partially in the radial direction from the center of rotation of the disk and allows the tip 36 to be positioned to different data tracks and maintained on a desired data track.

The microfabricated cantilever structure 10 includes a base 12 attached to support 220, a beam portion that comprises ribs 18, 20, 22, and 24, and a probe 28. The probe 28 is fabricated with a piezoresistor in the form of piezoresistive elements 78, 80 that are electrically conducting, with their resistance changing as the probe 28 is bent. The tip 36 is located at the free end of the probe 28. The tip 36 is positioned to engage the surface of the storage disk 210 by physically contacting the data pits 212. The tip 36 is downwardly biased so that it tracks the surface topography of the disk. When the disk 210 is rotated, the probe 28 rises and falls as the tip 36 tracks over the data pits 212.

Figure 2:
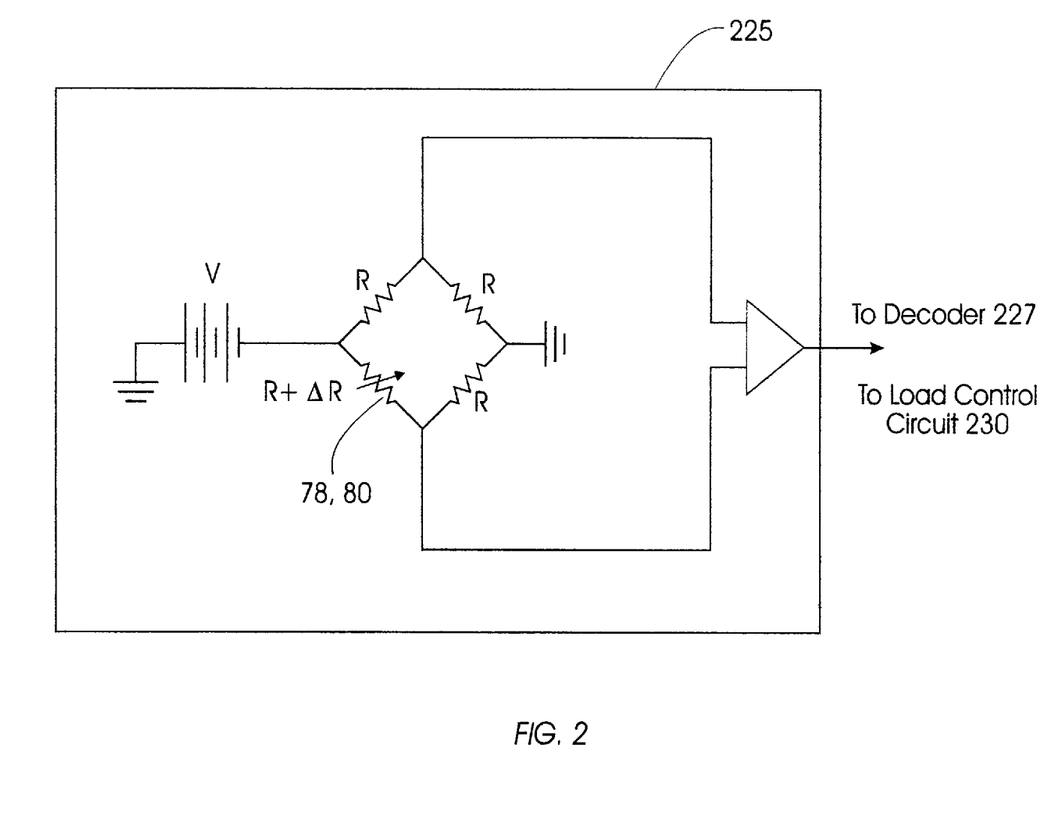
FIG. 2 is a schematic of the vertical resistance measurement circuit used to detect cantilever deflections in a direction perpendicular to the medium surface.

A resistance measurement circuit 225 is connected to the piezoresistive elements 78, 80 by means of conducting wires. As the tip 36 tracks the marks on the storage disk 210, the resistance of piezoresistive elements 78, 80 on probe 28 changes. This change is continuously monitored and measured by the resistance measurement circuit 225. The resistance measurement circuit 225 has a drive voltage (V) and a resistance bridge suitable for measuring small changes in resistance (ΔR), as shown in FIG. 2. Each of the three fixed resistors R in the bridge has a resistance approximately equal to the resistance on the probe 28 when it is not bent. The variable resistor in FIG. 2 represents the two piezoresistive elements 78, 80. The measured output voltage ΔV due to the change in resistance ΔR of the piezoresistive elements 78, 80 in the probe 28 when it is bent is approximately:

$$(V/4)*(\Delta R/R).$$

The typical fractional change in lever resistance, ΔR/R, is of the order $10^{-7}$ to $10^{-5}$ per Angstrom of deflection. For marks 50 nm high and a driving voltage of 2 volts, this produces an output voltage ΔV of approximately 0.1–10 mV. This analog voltage change from resistance measurement circuit 225 is amplified and then converted into a digital signal by a decoder 227 that generates the data output. Such decoding can be done either by means of conventional peak detection or threshold detection, depending on the method of data encoding used.

The system of FIG. 1 can be operated in a "constant force" mode, a "constant height" mode, or a combination thereof. In a constant force mode, the movement of the actuator 222 perpendicular to the disk surface in a direction along the Z-axis is controlled by the load control circuit 230 which uses information obtained from the piezoresistive elements 78, 80 in cantilever probe 28, via the resistance measurement circuit 225, as to the features on the disk surface. The signal sent to the actuator 222 from the load control circuit 230 can be used to maintain constant deflection of cantilever probe 28, and thus a constant loading force on the tip 36. In constant height mode, the actuator 222 does not move the cantilever probe 28 perpendicular to the disk surface so the cantilever probe deflects varying amounts as the surface marks pass under it. In combination mode, the load control circuit 230 and actuator 222 are used to maintain a generally constant loading force on a long time scale, taking out variations due to long-term drift, for example, or large features on the surface of the disk. The cantilever probe 28 is left free to deflect, however, as the tip 36 encounters the small surface marks. The combination mode is the preferred embodiment for the data storage AFM system. The signal from the resistance measurement circuit 225 is used as the input to the decoder 227, which converts it to binary form, i.e., machine-readable information, in a manner well known in the art, to generate the output data.

Figure 3:
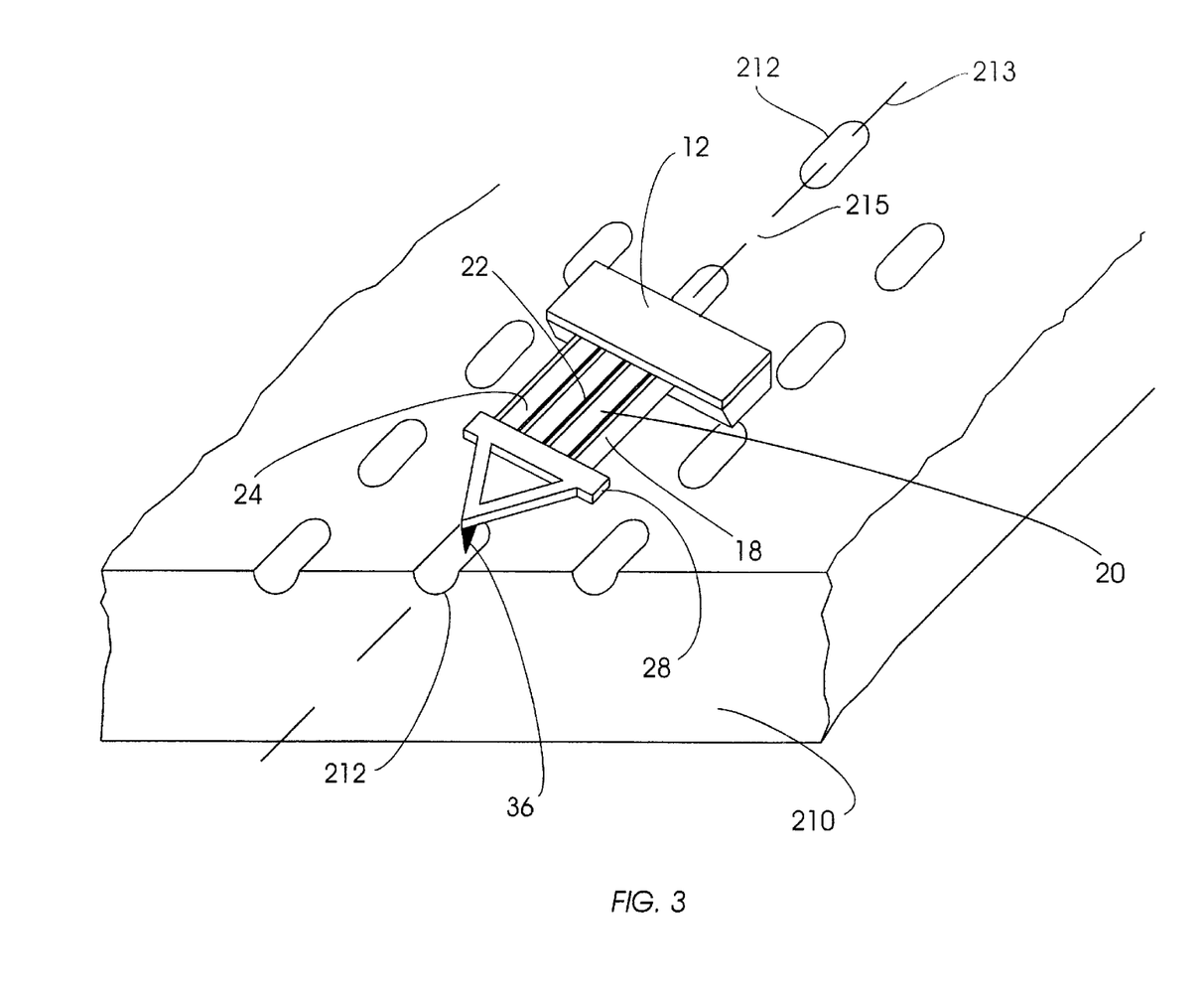
FIG. 3 is a perspective view of the cantilever structure located on a data disk with the probe tip located in a data pit.

Referring to FIG. 3 which shows a section of disk 210, the storage disk has data marks embossed on it. The data marks may be either bumps or pits, but are shown in FIG. 3 as narrow, variable-length pits 212 that form a pulse width modulation (PWM) encoding scheme. The data pits 212 are separated by lands 215 and the series of pits 212 and lands 215 along a line, such as line 213, comprise a data track. Alternatively, the data marks can be of the same size but varied in position along the track, thus forming a pulse position modulation (PPM) encoding scheme, or the data marks can be varied in depth or height, thus forming an amplitude modulation encoding scheme. The smallest of the data pits 212 are approximately 50 nm wide and are arranged to form radially-spaced data tracks that are circular in shape and centered about the center of the disk 210.

In the preferred embodiment, the disk is a read-only disk. The data marks are written on a master disk and then embossed into the storage disk. The marks are formed on the master disk by electron beam writing on PMMA resist-covered silicon oxide, as described by Terris et al., "Nanoscale Replication for Scanning Probe Data Storage", *Appl. Phys. Lett.,* Vol. 69, No. 27, Dec. 30, 1996, pp. 4262–4264. After exposing the resist using an electron beam, the written data pattern is transferred to the silicon oxide by appropriate developing of the resist and etching. Alternatively, a master can be made using an AFM tip to create marks in a polymer master, which is also described in the Terris et al. paper.

The pattern of surface marks is then embossed into the storage disk by molding, as described in U.S. Pat. No. 4,948,703. A thin film of a photocurable polymer film is formed on the surface of the master. Prior to forming this film, the master is coated with a release agent, such as amorphous TbFeCo. A glass substrate, which forms a base for the storage disk, is pressed against the thin polymer film. The film is exposed to ultraviolet light to cure it, thus forming a hardened polymer film. The master and disk support are separated, leaving the hardened polymer attached to the glass support. Alternatively, marks can also be formed by injection molding or by pressing the master into a heated PMMA film, as described by Chou et al., "Imprint Lithography with 25-Nanometer Resolution", *Science,* Vol. 272, Apr. 5, 1996, pp. 85–87. The data marks represent a series of 1's and 0's and thus represent stored data. Such marks can alternatively be written onto the storage disk directly by the tip to form a write-once type of data storage medium as described by Mamin, "Thermal Writing Using a Heated Atomic Force Microscope Tip", *Appl. Phys. Lett.,* Vol. 69, No. 3, Jul. 15, 1996, pp. 433–435.

Referring again to FIG. 3, the cantilever structure is illustrated in a perspective view showing the tip 36 located in a data pit 212 on the surface of disk 210. The beam portion of cantilever structure 210 is used to maintain the tip 36 on the data track, represented by dashed line 213. The beam portion 14 includes ribs 18, 20, 22, 24. The ribs 20, 22 have piezoresistors 54, 56 (FIG. 1) embedded in them so that deflection in the X-direction (lateral deflection in the direction generally parallel to the surface of disk 210 and generally perpendicular to the direction of data track 213) causes a change in their resistance. Such a deflection will arise when the tip 36 is not centered on the data pit 212. Assuming there is lateral deflection, the resulting change in resistance in the piezoresistors 54, 56 is measured using the lateral resistance measurement circuit 235 (FIG. 1), similar to the vertical resistance measurement circuit 225 used for load control. The output of the lateral resistance measurement circuit 235 is a tracking error signal (TES) that is fed into a tracking control circuit 240, whose output can move the cantilever structure in the X-direction to zero the TES. The basis for the generation of the TES is that if the tip 36 is not centered over the data pit 212, then the finite slope of the data pit 212 gives rise to a lateral force on the tip 36, which in turn causes a lateral deflection of the ribs 18, 20, 22, 24. To understand this, consider FIG. 4, which is a detail of the cross-section of the tip 36 and data pit 212, where the tip 36 is not centered over the pit 212. The slope of the sidewall 243 of the pit 212 makes an angle θ with respect to a horizontal plane parallel to the disk surface. The forces can be broken down as follows. First, in a stable configuration, the net force exerted on the tip must be zero or the tip would move either up and down the slope of the pit or perpendicular to the surface of the disk. The forces are $F_z$, the downward force due to the loading of the cantilever probe 28, a frictional force $F_f$, a lateral force $F_x$ due to any restoring force of the cantilever in the X-direction, and $F_n$, the force exerted on the tip by contact with the disk. Putting the X and Z components of the forces equal to zero yields a relation between the forces $F_x$ and $F_z$, namely $$F_x = F_z \tan \theta + F_f/\cos \theta. \tag{1}$$

The loading force $F_z$ is set by the bending of the cantilever probe 28 in the vertical direction, which is in turn set by the load control circuit 230. That is, the load control circuit 230 moves the cantilever probe 28 toward the disk surface until it begins to bend, causing the resistance to change. This changes the output of the bridge voltage (FIG. 2), which is used as the input to the load control circuit 230. Thus, a certain loading force $F_z$ is maintained.

Figure 4:
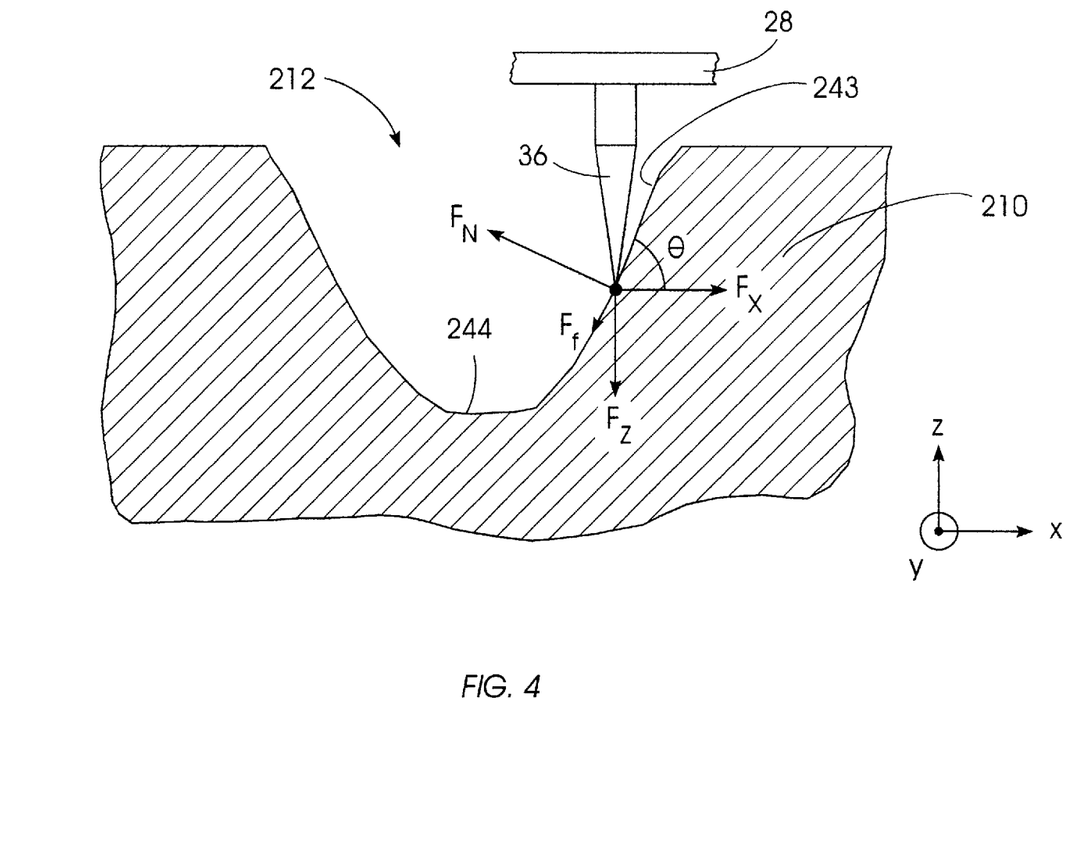
FIG. 4 is an enlarged view illustrating the forces acting on the probe tip when it is in contact with a side wall of a data pit.

When the tip 36 rides in the center 244 of the data pit, there is no lateral force on the tip. If the disk moves in the minus X direction due to disk runout, for example, there will initially be a component of force along the direction parallel to the sloped surface of pit 212. This will cause the tip to ride up the pit surface until it reaches the stable condition described above. At that point, there will be a lateral force $F_x$ given by Eq. (1). This force will cause a deflection in the ribs 18, 20, 22, 24 of the cantilever structure. This will in turn give rise to a change in resistance in the piezoresistors 54, 56, which will be detected by the lateral resistance measurement circuit 235. Because the slope changes sign on the two walls of the data pit and the friction always acts so as to resist motion, the direction of the force $F_x$, and thus the polarity of the bridge output, changes sign on the two walls of the pit. This is just the condition suitable for a TES. As a specific example, consider the case where the pit 212 has a cross-section whose shape is described by the parabola $z = Cx^2$ and assume friction can be neglected. Then, the slope $\tan\theta$ is given by $dz/dx = 2Cx$ so $F_x = x(2CF_z)$. In this simple example, the error signal is simply proportional to X, the distance of the tip 36 from the center 244 of the pit 212. A similar derivation for the lateral force can also be made if the data marks are bumps instead of pits.

It is seen from Eq. (1) that for a slope of 45 degrees, the lateral and vertical forces will be equal, neglecting friction. Because the cantilever structure independently senses vertical and lateral deflections, it will need to detect X and Z forces which are comparable. Thus, the force sensitivity of the cantilever structure must be comparable in the two directions. The advantage of the cantilever structure is that the geometry of the ribs 18, 20, 22, 24 can be designed separately from the cantilever probe 28 so as to achieve high sensitivity for both directions. This was not possible in the prior art technique of using tracking schemes that sense lateral forces via a signal representing cantilever twist because it is difficult to design a cantilever which has a sensitivity to twist that is comparable to its sensitivity to vertical deflection. This is because it is difficult to make the cantilever as narrow as it is thin.

In the embodiment shown and described with respect to FIGS. 3 and 4, the TES is generated by the side walls of the data marks. The portions of the data tracks that are located between data pits 212 and do not contain data pits are referred to as lands, shown as lands 215 in data track 213. While the TES is not continuous when on data track 213, due to the fact that there is no signal when the tip 36 is over a land 215, the TES is generated over a large fraction of the data track. In fact, that fraction is much larger than in typical sector servo schemes that are well known in magnetic recording disk drives. As in those schemes, the tracking control circuit 240 has a characteristic bandwidth so that it responds to some average off-track position over some finite region of track length.

Figure 5:
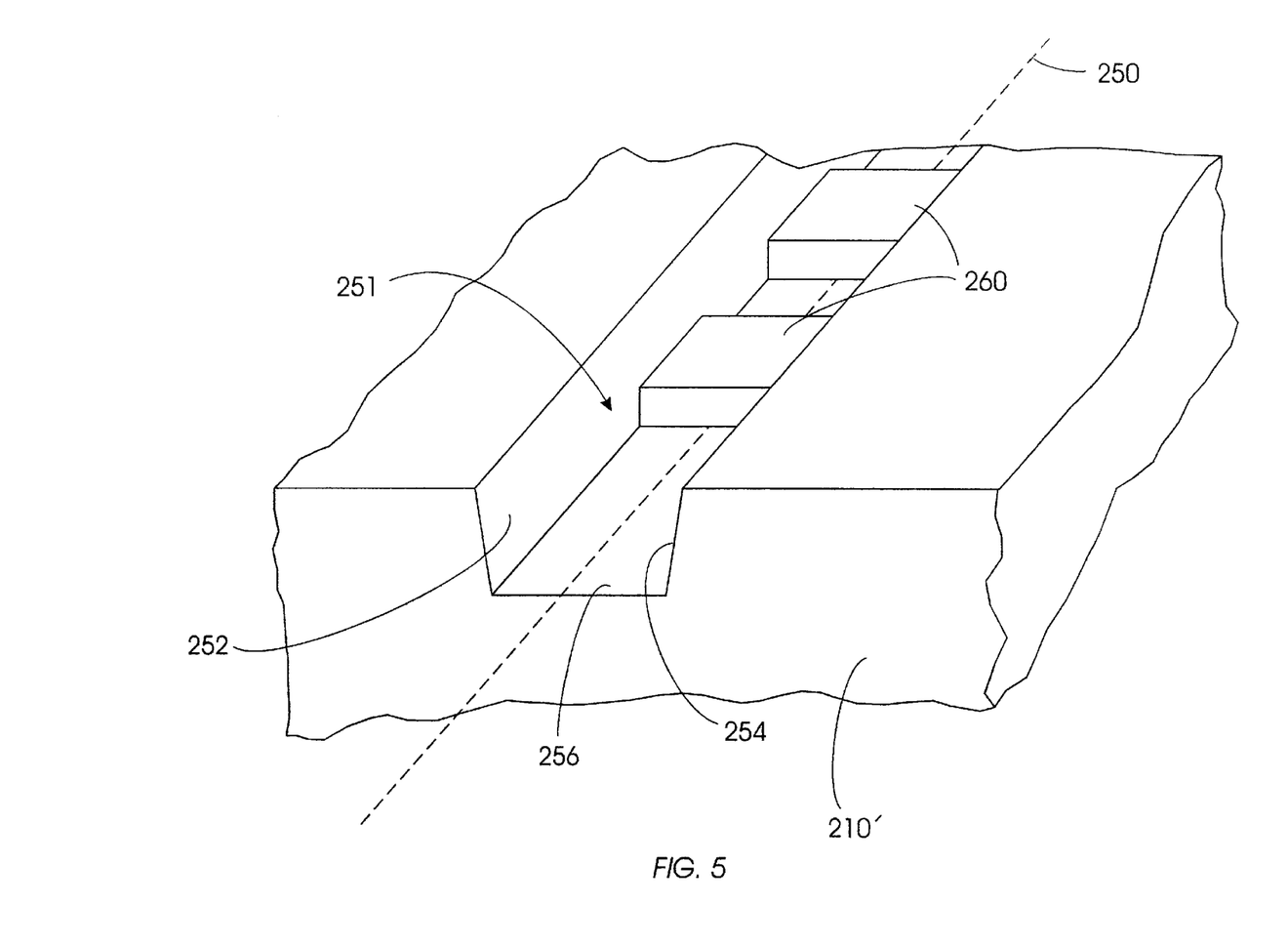
FIG. 5 is a perspective view of an alternative embodiment of the disk illustrating a data track having a groove in the disk surface and data bumps located at the bottom of the groove.

In the present invention, if a truly continuous TES is desired around the entire circumference of the data tracks, then it is possible to use a grooved disk. In this case, rather than detecting the slope of the data pits, the cantilever structure detects the slope of the side walls of the grooves. The data marks, which may be pits or bumps, are located at the bottoms of the grooves and are still accessible by the tip. This alternative embodiment is shown in FIG. 5. In the disk 210' of FIG. 5, a single data track 250 is shown. The probe tip will follow the features of data track 250, which includes the groove 251 with side walls 252, 254 and bottom 256. Data marks in the form of bumps 260 are located on the bottom 256 of groove 251. Alternatively, the data marks can be data pits located in the bottom of the groove.

The actuator 222 (FIG. 1) is a VCM actuator that has coils that control fine tracking movement of the tip in the X-Y plane (along a radius of the disk). The coils receive the output of tracking control circuit 240, shown in FIG. 6. The frequency response of the circuit 240 is adjusted using R21, R23, R26, R27, C21, C22 and the gain adjusted with R22 and R24. Once the actuator 222 has moved the tip 36 to the desired data track, switch S21 is closed. The input of the circuit is the output of the lateral resistance measurement circuit 235 (which is similar to circuit 225 shown in FIG. 2). This output is zero when the tip 36 is in the center of the data pits on the desired track. Thus, operational amplifiers OP22 and OP23 will continually adjust the output of the tracking control circuit 240, which is connected to the coils of actuator 222 so as to keep the $\Delta V$ TES output of circuit 235 at zero. When it is desired to turn off tracking control, as might be the case when the tip 36 is to be moved to another data track, switch S1 is opened.

Figure 6:
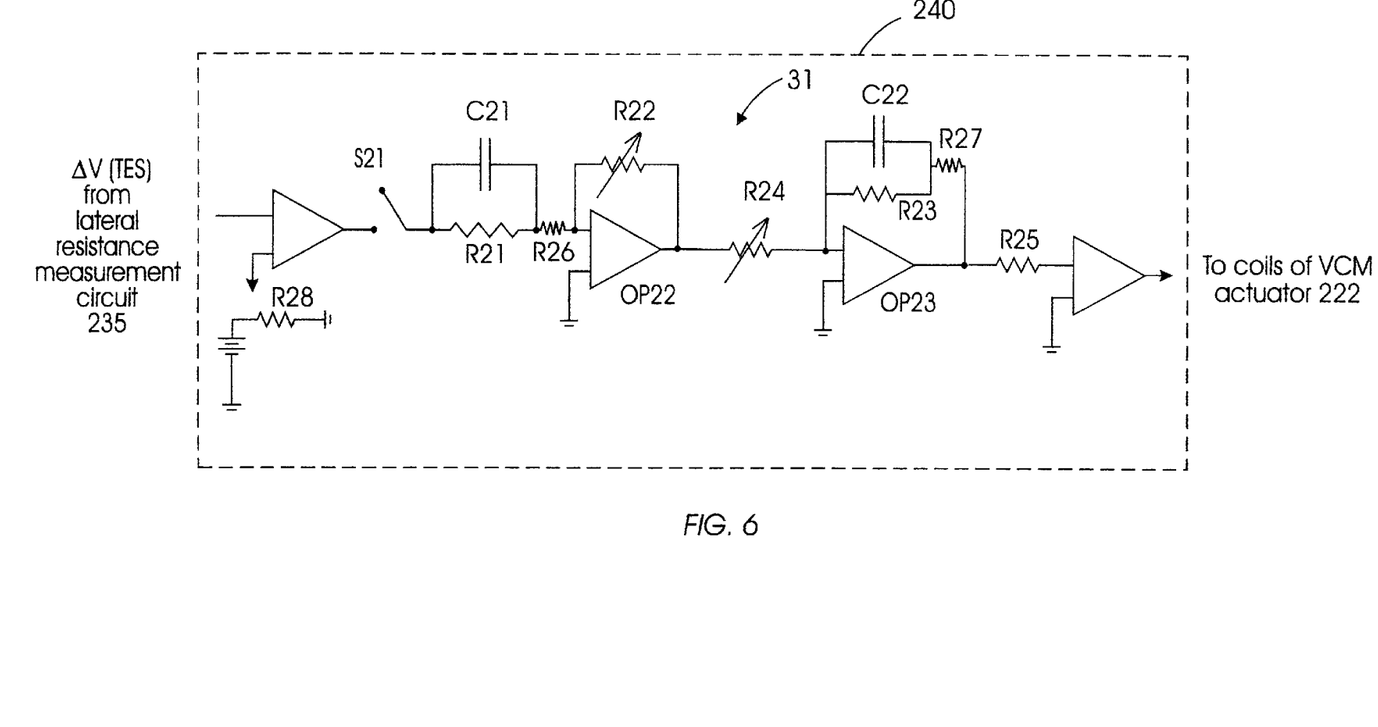
FIG. 6 is a schematic of the tracking control circuit of the data storage system.

The tracking control circuit 240 also includes a variable resistor R28 that allows a set point voltage to be selected for comparison with the $\Delta V$ input. This set point voltage is nominally zero because the $\Delta V$ TES input is zero when the tip 36 is in the center of the data track. However, for an asymmetrically-shaped tip, the optimum data readback may occur with the tip slightly off the center of the track. Also, if the resistances of the fixed resistors in the bridge of the lateral resistance measurement circuit 235 (like the circuit 225 shown in FIG. 2) are not exactly equal, the $\Delta V$ TES input to tracking control circuit 240 will be nonzero even when the tip is on the center of the track. In either case, the set point of resistor R28 can be adjusted to a nonzero value to account for this.

While the tracking control circuit 240 is shown in analog form in FIG. 6, its functions can be implemented, along with the functions of load control circuit 230, in a digital signal processor.

Micromachined Cantilever Structure

Figure 7:
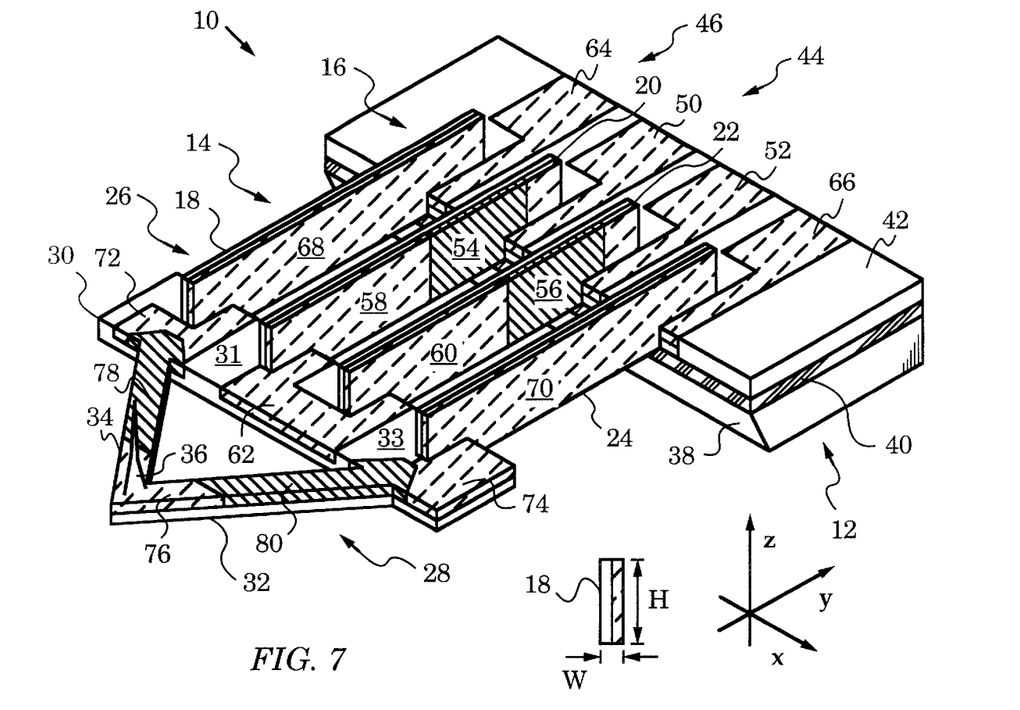
FIG. 7 is an isometric view of a cantilever structure used in the invention.

The preferred embodiment of a micromachined cantilever structure 10 according to the invention is illustrated in FIG. 7. A block or base 12 of structure 10 supports a beam portion 14 by a fixed end 16. Four high aspect ratio ribs 18, 20, 22, 24 make up beam portion 14. As shown in the example of the cross-section of rib 18, the height H of rib 18 is larger than its width W. In other words, the aspect ratio, H/W, of rib 18 is larger than 2:1. Preferably, the ribs 18, 20, 22, 24 have a width of 1–2 microns and a height of about 10 microns. The length of the ribs 18, 20, 22, 24 may be about 100 microns.

A probe 28 is mounted on a free end 26 of beam portion 14. In this embodiment, probe 28 has a triangular structure with a base 30, a first leg 32, and a second leg 34. Base 30 and legs 32, 34 actually form an isosceles triangle.

Alternatively, base 30 and legs 32, 34 can be arranged in a rectangle or other shapes. A sensing tip 36 is positioned at the apex of the triangle or at the junction between legs 32 and 34. Ribs 18, 20, 22, 24, probe 28, and tip 36 are adapted in shape, strength, and other mechanical characteristics to the specific application for which cantilever structure 10 is intended. For silicon, the probe 28 may have a thickness (vertical dimension) of 1–2 microns, a width in each leg 32, 34 of 10 microns, and an overall length of 100 microns (from a free end 26 to probe 28 tip).

Base 12 is built up of three layers. The bottom layer 38 is made of silicon. An intermediate insulating layer 40 consists of an oxide. A top layer 42 is made of silicon, just like bottom layer 38. It will be apparent to one skilled in the art that this layered structure of base 12 is not required. In the preferred embodiment, however, this arrangement of layers 38, 40, and 42 results from a preferred method of making cantilever structure 10 as described below.

Cantilever structure 10 has a first electrical circuit 44 and a second electrical circuit 46. The first electrical circuit extends through the regions numbered 50, 54, 58, 62, 60, 56, and 52. The second electrical circuit extends through regions numbered 64, 68, 72, 78, 34, 80, 74, 70, and 66. For better visualization, all electrically-conductive parts of cantilever structure 10 are hatched with dashed lines and piezoresistive parts are designated by solid cross-hatching. In fact, hatchings generally correspond to ion-implanted regions of structure 10, as explained below.

First electrical circuit 44 senses lateral deflections of the probe tip 36. Two contact pads 50 and 52 on the top face of top layer 42 provide for electrical connections. Two lateral-sensing piezoresistors 54 and 56 are positioned or patterned in sides 58 and 60 of ribs 20 and 22. Preferably, piezoresistors 54 and 56 are located at the points where ribs 20, 22 experience the highest mechanical stress when free end 26 is deflected laterally. In other words, the position of piezoresistors 54, 56 is selected to produce the maximum signal when ribs 20 and 22 bend along the X-axis. One such location is close to base 12. In addition, piezoresistors 54, 56 do not extend along the entire length of sides 58, 60 to avoid signal cancellation due to opposite polarities of piezoresistive response at the two ends of sides 58, 60.

The remaining portions of sides 58 and 60 are highly electrically conductive and have negligible piezoresistive properties. Base 30 of probe 28 includes a conducting portion 62 between sides 58 and 60 of ribs 20 and 22 to complete first electrical circuit 44. Thus, an electrical current can flow from pad 50 via piezoresistor 54 and side 58, through conducting portion 62 through side 60 and piezoresistor 56 to contact pad 52. Under lateral deflection, the resistance of first circuit 44 or, specifically, resistance of the piezoresistors 54, 56, will change.

Figure 8:
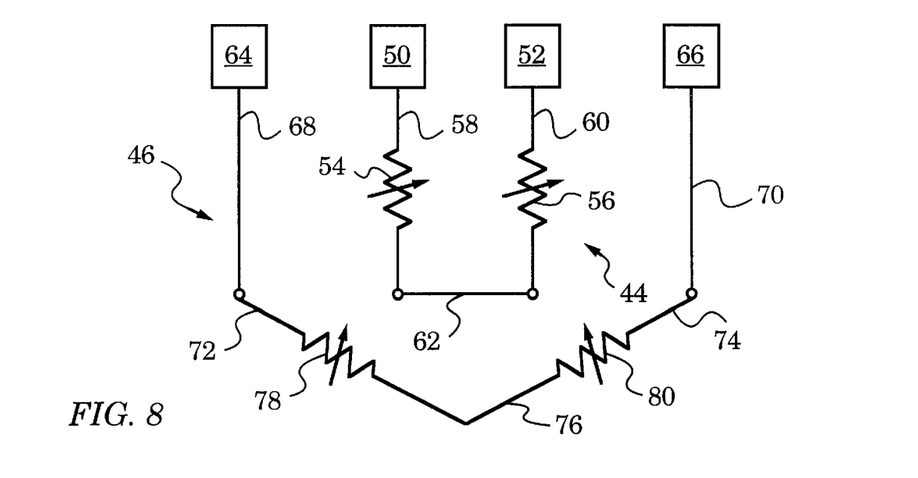
FIG. 8 is a circuit diagram of the two electrical circuits embedded in the cantilever structure of FIG. 6.

The equivalent circuit diagram for first circuit 44 is illustrated in FIG. 8. Piezoresistors 54, 56 are shown as variable resistors. The portions of circuit 44 corresponding to individual parts of cantilever structure 10 are referred to using the same reference numerals.

Figure 9:
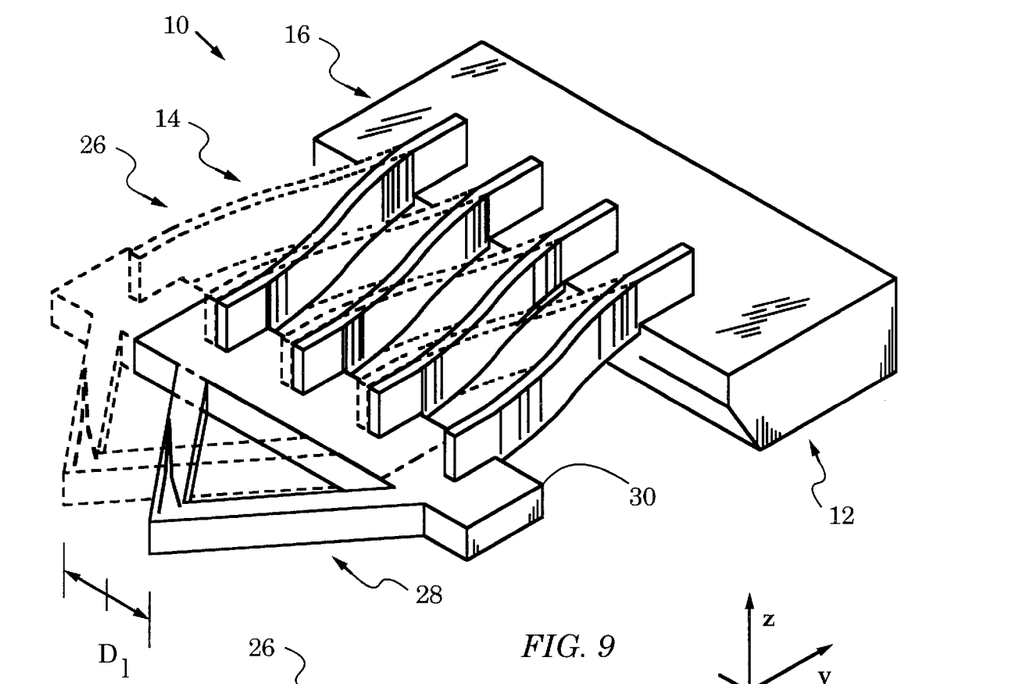
FIG. 9 is an isometric view illustrating lateral deflection of the beam portion of the cantilever of FIG. 6.

A range $D_1$ of lateral deflection of probe 28 along the X-axis is illustrated in FIG. 9. At the center (rest position) of range $D_1$, the resistance of piezoresistors 54 and 56 has a certain reference value. This reference value is used in measuring deflections of probe 28 to the left and to the right. The sign of the resistance change of piezoresistors 54 and 56 is positive or negative with respect to this reference value, depending on whether probe 28 is displaced to the right or left of the center of range $D_1$.

Referring back to FIG. 7, second electrical circuit 46 has two contact pads 64 and 66. Conductive sides 68 and 70 of ribs 18 and 24, conducting portions 72, 74, 76, and vertical-sensing piezoresistors 78, 80 complete circuit 46. The equivalent circuit diagram for circuit 46 is also shown in FIG. 8. Piezoresistors 78 and 80 are designated by variable resistors. Other portions of circuit 46 corresponding to individual parts of cantilever structure 10 are referred to using the same reference numerals.

It is noted that the two electrical circuits must be electrically isolated from one another. Therefore, the probe base 30 must not be conductive along its entire length. There must be high resistance regions on the probe base 30 that prevent the vertical and lateral deflection signals from mixing. This can be acomplished by including back-to-back P-N junctions (i.e., a PNP or NPN structure) in the regions 31, 33 between the ribs 18, 20, 22, 24 which conduct the vertical and lateral signals. This will effectively isolate the signals.

Figure 10:
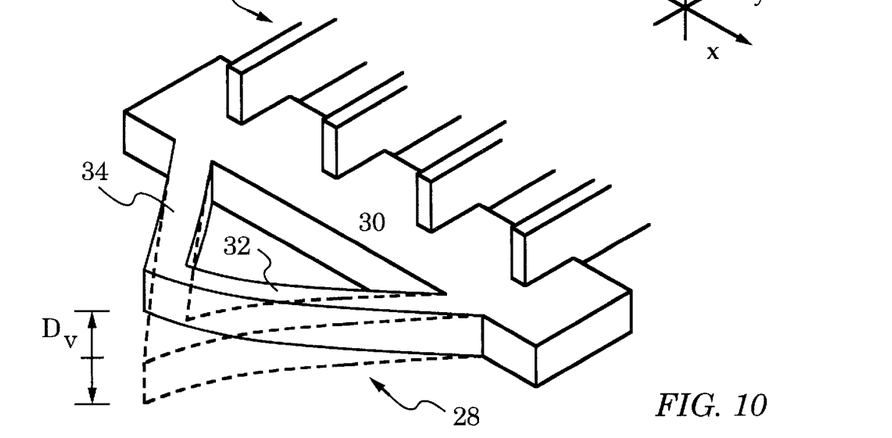
FIG. 10 is an isometric view illustrating the vertical deflection of the probe of the cantilever structure of FIG. 6.

FIG. 10 depicts a range $D_v$ of vertical deflection of probe 28, and specifically of legs 32 and 34, along the Z-axis. At the center (rest position) of range $D_v$, the resistance of piezoresistors 78 and 80 achieves a reference value. This reference value is used in measuring upward and downward deflections of probe 28. The sign of the resistance change of piezoresistors 78 and 80 is positive or negative with reference to this calibration value, depending on whether probe 28 is displaced down or up from the center of range $D_v$.

In other embodiments of the present invention, any number of high aspect ratio ribs may be used. Also, the ribs may have orientations different from the above-described embodiment. For example, the probe 28 may have ribs oriented for lateral force sensing, and the beam closest to the base 12 may have ribs oriented for vertical force sensing.

Method of Making the Cantilever Structure

Figure 11:
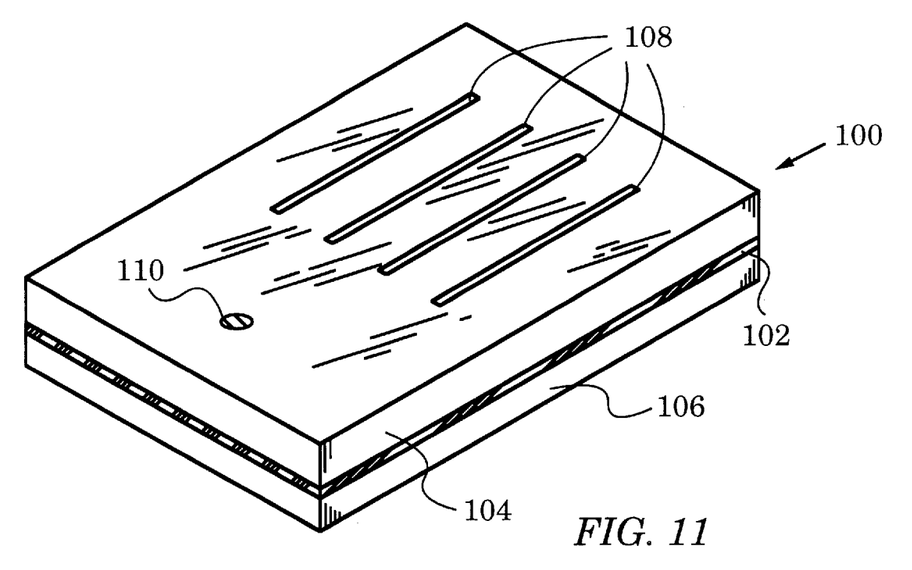
FIG. 11 is an isometric view of a block from which a cantilever structure is produced.

A preferred method of making cantilever structure 10 is shown in FIGS. 11–15. The process starts with a block of silicon 100 having a buried oxide layer 102, as illustrated in FIG. 11. Preferably, the block 100 has a (100) crystal orientation; this crystal orientation produces piezoresistors with relatively high sensitivity compared to other crystal orientations. Block 100 has a top layer 104 and a bottom layer 106, i.e., a bulk silicon layer. An oxide pattern 108 corresponding to ribs 18, 20, 22, 24 is formed on top layer 104. Also, a suitable photoresist 110 for producing tip 36 is formed on top layer 104. The thickness of the top layer 104 is equal to the height of the ribs 18, 20, 22, 24.

The orientation of the cantilever structure 10 with respect to the crystal lattice of the block 100 is an important consideration in the design of the present invention. The cantilever 10 must be oriented with respect to the crystal lattice such that both vertical-sensing piezoresistors 78, 80 and both lateral-sensing piezoresistors 54, 56 have a substantial coefficient of piezoresistivity. An incorrect orientation between the cantilever 10 and crystal lattice can render one or both sets of piezoresistors nonfunctional. The orientation of the cantilever structure is important in that it affects the orientation of the piezoresistors and, more specifically, the orientation of the electrical current path through the piezoresistors. For example, in P-type (e.g., boron-doped) silicon, the (–1 1 1), (–1 1 –1), (1 –1 1), and (1 –1 –1) directions in the (110) crystal plane have relatively high coefficients of piezoresistivity. The minus signs in the above crystal direction shorthand indicate negation, usually represented by an overbar. The dependence of piezoresistive properties upon crystal orientation is known in the art of semiconductor physics. Reference can be made to Yozo Kanda, "A Graphical Representation of the Piezoresistance Coefficients in Silicon", *IEEE Transactions on Electron Devices,* Vol. ED-29, No. 1, January 1981.

A specific acceptable orientation of the cantilever structure results if the block 100 from which the cantilever structure is made has a top surface parallel with the (100) crystal plane, and if the cantilever structure is further oriented such that the long dimension of the ribs 20, 22 extends in the (110) crystal direction.

Figure 12:
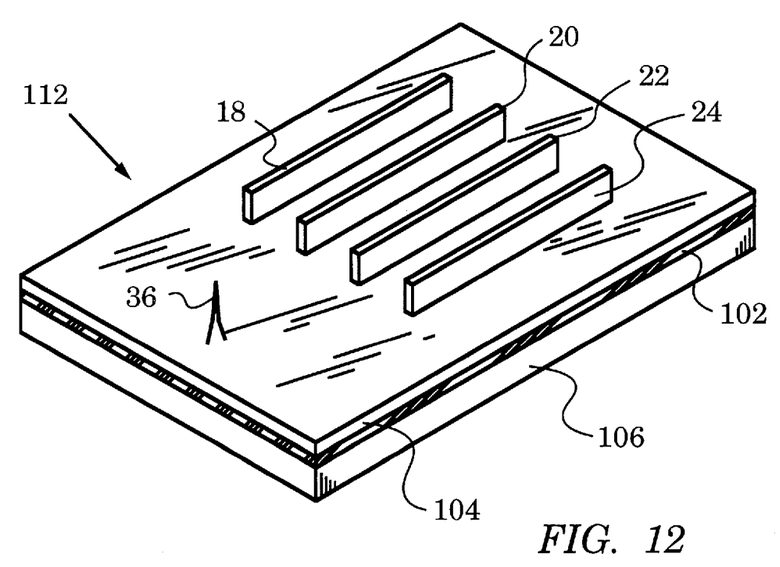
FIG. 12 is an isometric view of the block of FIG. 11 after a first processing step.

A first etching step, preferably using a plasma etcher capable of deep silicon etching, removes top layer 104 around pattern 108 to expose high aspect ribs 18, 20, 22, 24. During the same etching step, photoresist 110 is worn away from the top and from the sides and therefore gradually decreases in diameter. The silicon under the photoresist 110 is etched to produce a sharp tip 36. The resulting structure 112 is shown in FIG. 12. Note that a small thickness (1–2 microns) of original top layer 104 remains to cover buried oxide layer 102 and provide sufficient material for making probe 28. The thickness of the triangular probe 28 is equal to the thickness of the remaining top layer 104.

Figure 13:
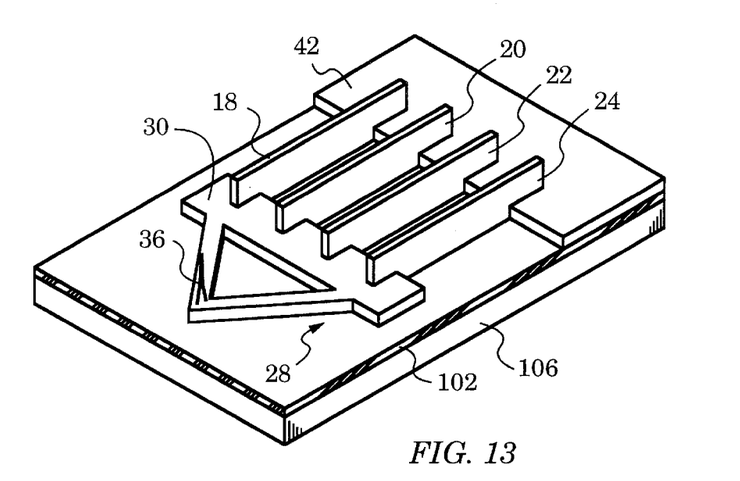
FIG. 13 is an isometric view of the block of FIG. 11 after a second processing step.

During a second etching step, the remainder of top layer 104 is etched away to produce probe 28 and top 42 of base 12. Of course, a new lithographic mask is needed for this etching step. Preferably, this etching step is also performed with a plasma etcher. The buried oxide layer 102 is now exposed in predetermined locations. The result of this processing step is illustrated in FIG. 13.

A third step, actually consisting of two separate ion implantation steps, is used to form electrical circuits 44 and 46. Those surfaces not intended to be doped are masked with photoresist. During the first ion-implanting step, illustrated in FIG. 14, the exposed surfaces of ribs 18, 20, 22, 24, probe 28, and top 42 are doped. In the preferred method, the doping is achieved by ion implantation with boron or another suitable element.

Figure 14:
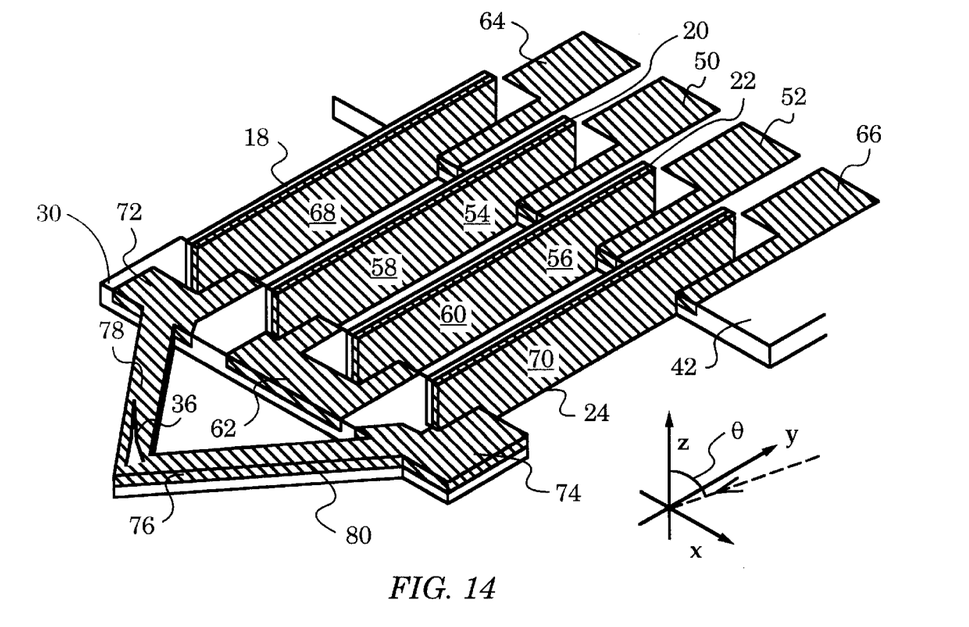
FIG. 14 is an isometric view of the block of FIG. 11 after a first ion implantation step.

It is well known that a heavily boron-doped region is highly conductive, while a lightly implanted region has a high piezoresistive coefficient in addition to moderate conductivity. Hence, in the first ion implantation step, all portions of first circuit 44 and second circuit 46 are lightly boron doped. This step produces lightly-doped regions, i.e., piezoresistive regions, corresponding to contact pads 50, 52, 64, 66, conductive sides 58, 60, 68, 70 of ribs 18, 20, 22, 24, conducting portions 62, 72, 74, 76, and piezoresistors 54, 56, 78, 80.

The boron implantation is most preferably performed with the ion beam, indicated by the dashed arrow, incident at angle θ≈45° to the vertical (Z-axis). This allows the entire side surface 68, 58, 60, 70 of each beam to be implanted. Preferably, the path of the incident ion beam lies in or close to the X-Z plane. Clearly, proper spacing between ribs 18, 20, 22, 24 is essential to prevent the production of shadows. Shadows will produce insulating regions.

Shadows must also be avoided at the locations where the ribs 18, 20, 22, 24 contact the top 42 of base 12 and where the ribs 18, 20, 22, 24 contact the probe base 30. In other words, a continuous conductive (i.e., ion-implanted) region must extend from the ribs 18, 20, 22, 24 to the probe base 30 and base 12.

Figure 15:
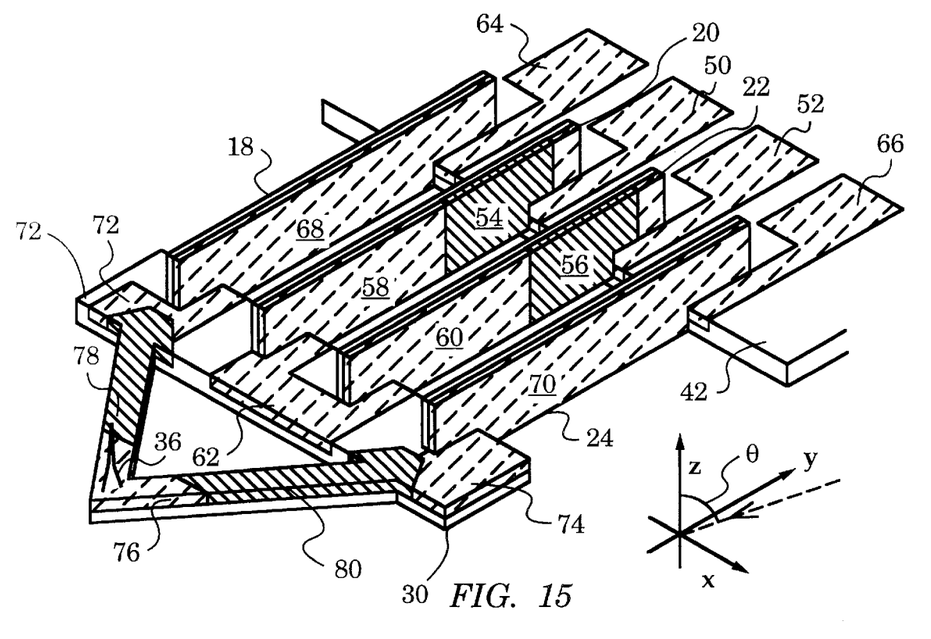
FIG. 15 is an isometric view of the block of FIG. 11 after a second ion implantation step.

During the second patterning step, shown in FIG. 15, the ion beam is once again incident at θ≈45°. An appropriate photoresist mask is used to ensure that regions corresponding to piezoresistors 54, 56, 78, 80 are not exposed to the ion beam. Meanwhile, the remaining portions of circuits 44 and 46 receive a high dose of boron and become highly conductive.

All the implants are then activated using thermal annealing. Metallic contact pads are then formed on base top surface 16 to allow external electrical connections to be made to regions 50, 52, 64, 66.

Finally, in a finishing step, bottom layer 106 and remaining oxide layer 102 are etched away to release cantilever structure 10, as illustrated in FIG. 7. For example, potassium hydroxide and hydrofluoric acid can be used to etch the silicon bottom layer 106 and oxide layer 102, respectively. The cantilever structure 10 can be protected from etching by exposing only the reverse side of the wafer to the etch.

To prevent the entire bottom layer 106 from being etched away, a suitable mask (silicon nitride) can be used to protect it.

Figure 16:
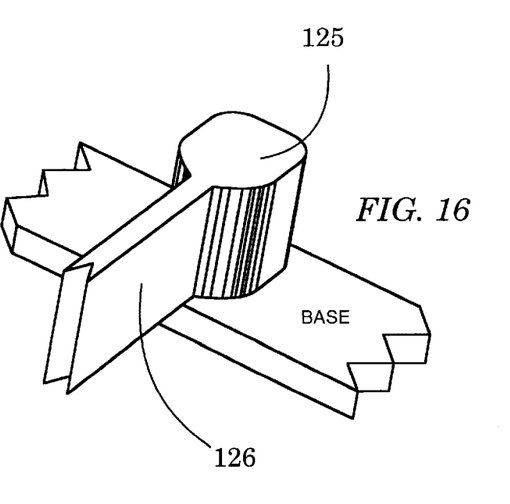
FIG. 16 is a closeup view of where a rib contacts the base.

A closeup of the end of a rib is shown in the perspective view of FIG. 16. It is noted that making the ends 125 of the ribs 18, 20, 22, 24 wider than the midsection 126 of the ribs is advantageous because it will make the structure 10 stronger by means of a larger contact footprint between the ribs and base 12 and probe base 30.

Figure 17:
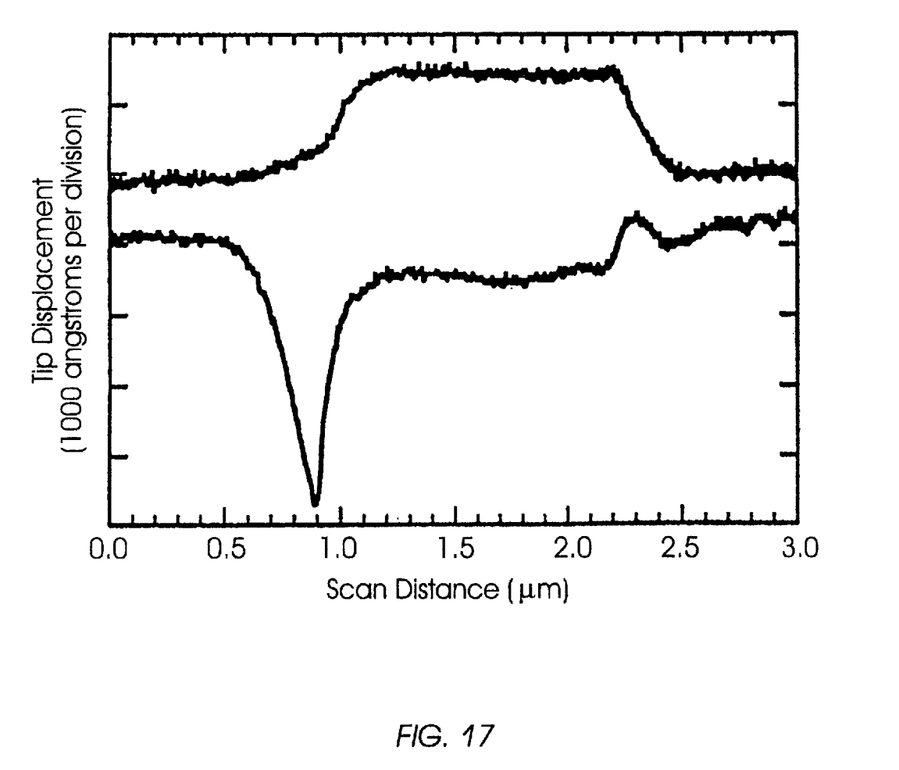
FIG. 17 is a scan graph of a vertical step obtained with the cantilever structure.

The graphs in FIG. 17 illustrate the performance of cantilever structure 10 in scanning across a rising step on a surface (not shown). The lower graph corresponds to lateral deflection measured by resistance change in circuit 44. As expected, probe 28 is first laterally deflected when tip 36 encounters the rising edge. Then the tip 36 climbs on top of the step. The top graph shows the vertical deflection of tip 36 as it moves up.

While the preferred embodiments of the present invention have been illustrated in detail, it should be apparent that modifications and improvements may be made to the invention without departing from the spirit and scope of the invention as described in the following claims.

What is claimed is:

1. An atomic force microscope-based data storage system comprising:

a data storage medium having data marks formed on its surface defining machine-readable information, the data marks being formed as a plurality of tracks;

a micromachined cantilever structure for engagement with the medium surface comprising a) a base;

b) a beam portion having a fixed end and a free end, the fixed end being attached to the base, the beam portion comprising at least one rib;

c) a probe having a deflecting portion and being mounted on the free end for engagement with the data marks on the medium surface;

d) a lateral-sensing piezoresistor on the rib such that the resistance of the lateral-sensing piezoresistor changes when the probe is deflected laterally in a direction generally parallel to the medium surface; and e) a vertical-sensing piezoresistor on the probe such that the resistance of the vertical-sensing piezoresistor changes when the deflecting portion of the probe is deflected in a direction generally perpendicular relative to the medium surface by the data marks;

means for providing relative motion between the storage medium and the probe;

an actuator connected to the base of the cantilever structure for moving the probe;

a first electrical resistance measurement circuit connected to the lateral-sensing piezoresistor for generating a tracking error signal in response to changes in resistance of the lateral-sensing piezoresistor, the resistance changes being representative of movement of the probe laterally with respect to a track;

a tracking controller circuit coupled to the actuator and responsive to the tracking error signal for maintaing the probe on a desired track;

a second electrical resistance measurement circuit connected to the vertical-sensing piezoresistor for sensing the change in resistance of the vertical-sensing piezoresistor as a result of deflection of the deflecting portion of the probe caused by the data marks on the medium surface; and a data decoding circuit for receiving the output signal from the second electrical resistance measurement circuit and for converting the output signal to digital data signals representative of the machine-readable information formed by the data marks on the medium surface.

2. The data storage system according to claim 1 wherein the medium is a disk and wherein the data tracks are generally radially-spaced tracks.

3. The data storage system according to claim 2 wherein the tracks are discrete generally concentric tracks.

4. The data storage system according to claim 2 wherein the tracks are generally spiral tracks.

5. The data storage system according to claim 2 wherein the means for providing relative motion is a spindle motor attached to the disk, and wherein the disk is removable from the spindle motor.

6. The data storage system according to claim 1 wherein the probe includes a tip that physically contacts the data marks on the medium surface.

7. The data storage system according to claim 1 wherein the data marks are pits in the medium surface.

8. The data storage system according to claim 1 wherein the data marks are bumps on the medium surface.

9. The data storage system according to claim 1 wherein the tracks are grooves in the medium surface and the data marks are located at the bottoms of the grooves.

10. The data storage system according to claim 9 wherein the data marks are pits at the bottoms of the grooves.

11. The data storage system according to claim 1 wherein the data marks are bumps at the bottoms of the grooves.

12. The data storage system according to claim 1 wherein the probe is a triangular structure comprising a probe base, a first leg and a second leg, the deflecting portion of the probe including the first leg and the second leg, and the probe base being attached to the free end of the cantilever structure beam portion, and wherein the vertical-sensing piezoresistor comprises a pair of piezoresistive elements, each piezoresistor element being located on a respective leg.

13. The data storage system according to claim 1 wherein the beam portion of the cantilever structure comprises a first rib and a second rib, and wherein the lateral-sensing piezoresistor comprises a pair of piezoresistive elements, each piezoresistive element being located on a respective rib.

14. An atomic force microscope-based data storage disk drive comprising:

a data storage disk having data marks formed on its surface defining machine-readable information, the data marks being formed as a plurality of radially-spaced tracks;

a micromachined cantilever structure for engagement with the disk surface comprising
 a) a base;
 b) a beam portion having a fixed end and a free end, the fixed end being attached to the base, the beam portion comprising two ribs;
 c) a probe having a deflecting portion and a tip and being mounted on the free end for engagement of the tip with the data marks on the disk surface;
 d) a lateral-sensing piezoresistive element on each of the two ribs such that the resistance of the lateral-sensing piezoresistive elements changes when the probe tip is deflected laterally by the data marks in a direction generally parallel to the disk surface; and
 e) a vertical-sensing piezoresistor on the probe deflecting portion such that the resistance of the vertical-sensing piezoresistor changes when the deflecting portion of the probe is deflected in a direction generally perpendicular relative to the disk surface by the data marks;

a spindle motor for rotating the disk;

an actuator connected to the base of the cantilever structure for moving the probe tip;

a first electrical resistance measurement circuit connected to the lateral-sensing piezoresistive elements for generating a tracking error signal in response to changes in resistance of the lateral-sensing piezoresistive elements, the resistance changes being representative of movement of the probe tip laterally with respect to a track;

a tracking controller circuit coupled to the actuator and responsive to the tracking error signal for maintaining the probe tip on a desired track;

a second electrical resistance measurement circuit connected to the vertical-sensing piezoresistor for sensing the change in resistance of the vertical-sensing piezoresistor as a result of deflection of the deflecting portion of the probe caused by the data marks engaging the probe tip; and a data decoding circuit for receiving the output signal from the second electrical resistance measurement circuit and for converting the output signal to digital data signals representative of the machine-readable information formed by the data marks in the tracks on the disk surface.

15. The data storage disk drive according to claim 14 wherein the tracks are discrete generally concentric tracks.

16. The data storage disk drive according to claim 14 wherein the tracks are generally spiral tracks.

17. The data storage disk drive according to claim 14 wherein the probe tip physically contacts the data marks.

18. The data storage disk drive according to claim 14 wherein the data marks are pits in the disk surface.

19. The data storage disk drive according to claim 14 wherein the data marks are bumps on the disk surface.

20. The data storage disk drive according to claim 14 wherein the tracks are grooves in the disk surface and the data marks are located at the bottoms of the grooves.

21. The data storage disk drive according to claim 20 wherein the data marks are pits at the bottoms of the grooves.

22. The data storage disk drive according to claim 20 wherein the data marks are bumps at the bottoms of the grooves.

23. The data storage disk drive according to claim 14 wherein the probe is a triangular structure comprising a probe base, a first leg and a second leg, the deflecting portion of the probe including the first leg and the second leg, and the probe base being attached to the free end of the cantilever structure beam portion, and wherein the vertical-sensing piezoresistor comprises a pair of piezoresistive elements, each piezoresistive element being located on a respective leg.

* * * * *